United States Patent Office 3,711,279
Patented Jan. 16, 1973

3,711,279
METHODS FOR MANUFACTURE OF SINTERING THIN POROUS METALLIC SHEETS
Andre R. Hivert, Pontoise, and Philippe M. Galmiche, Clamart, France, assignors to Office National d'Etudes et de Recherches Aerospatiales (par abbreviation O.N.E.R.A), Chatillon-sous-Bagneux, France
No Drawing. Filed Feb. 4, 1970, Ser. No. 8,749
Claims priority, application France, Feb. 7, 1969, 6902847
Int. Cl. B22f 3/10
U.S. Cl. 75—222
19 Claims

ABSTRACT OF THE DISCLOSURE

A blank is produced by shaping a material comprising at least one metallic powder agglomerated by a solid binder. The solid binder is a resin which is initially liquid and present throughout the shaping step and sublimable at a temperature below that of the sintering treatment. This resin is then eliminated by sublimation and the sintering treatment follows. The solid resin may be polymethylmethacrylate, polystyrene, a polymethylstyrene type resin or a copolymer of glycolphthalomaleate and methylmethacrylate. The shaping of the blank may be by means of a liquid monomer containing a polymerisation catalyst and a suitable solvent.

---

The present invention relates, on the one hand, to methods for the manufacture by sintering of porous metallic parts, the expression "metallic parts" being taken here in a very general sense and being applied both to the case where the constituent material of the part is a pure metal and to those where the said material is an alloy or a metallic compound, and on the other hand, to the porous metallic parts manufactured by such methods.

It should be noted that the invention envisages more particularly, because it is in their case that its application appears to be most advantageous, but not exclusively, among these porous metallic parts and methods for their manufacture, those relating to thin porous parts (parts of which the minimal dimension does not exceed 2 mm.) with a fine porosity (diameter of pores comprised for example between 1 and 10 microns) evenly distributed, with high permeability (total porosity comprised for example between 30 and 50%), and of great surface lightness (preferably less than 0.3 g./cm.²), porous parts of this type being, especially, applicable as thin plates intended to play the role of electrodes, of filters, of diaphragms, etc., in devices, such as especially fuel cells (hot cells), utilising diffusion or reaction at high temperatures (capable of reaching 800° C. and even higher) of liquid or gaseous phases, possibly corrosive (fuel gas for example).

Before outlining the principal feature of the invention, it appears opportune to indicate that the methods known up to the present for manufacture by sintering of porous metallic parts all have drawbacks or at least limitations in their field of application, certain of them not permitting an evenly distributed porosity to be obtained in the case of thin parts, others giving rise to the formation of flaws in the mass of the part, others giving rise to alloys or damaging residues (especially carbon residues), others again only being capable of consideration for parts constituted of metals of high melting point, or from which the oxides are easily removable, and only giving moreover imperfect results in spite of this limitation of application, not to speak of difficulties encountered in obtaining good surface condition of the parts, satisfactory strength of the said parts at high temperatures (above 600° C.), and a relatively low cost price.

It is a particular object of this invention, to render the methods in question and the corresponding porous metallic parts, that the drawbacks summarized above may be avoided or at least greatly reduced and that the above-said parts may also benefit in certain fields of application (thin electrode plates especially for fuel cells) from additional advantages which will be described below.

It should be specified also, to avoid any ambiguity on the subject of the principal feature of the invention which will be defined below, that the term "sublimation," used in this description, denotes the transformation by heating of a solid or elasto-viscous phase into a gaseous phase, this transformation being total (or almost total), without passage through the liquid state, and being able to result, either from a simple change of physical state, or from a physico-chemical reaction of dissociation such as, for example, depolymerisation.

Taking into account the preceding specifications, the invention consists, principally, in order to manufacture by hot sintering a porous metallic part, from a previously produced blank of the said part of a material comprising at least one metallic powder agglomerated by a solid binder.

On the one hand, to effect the shaping of the blank, in incorporating the above-said metallic powder in a viscous initial liquid product which remains present during the whole operation of shaping and which thus is present, once the said shaping has been achieved, in a state of a sublimable solid resin constituting the above-said solid binder and of which the sublimation temperature is lower than the hot sintering treatment temperature contemplated.

On the other hand, in proceeding then with a heat treatment conducted at a temperature between the sublimation temperature of the above-said sublimable resin and the temperature of the abovesaid hot sintering treatment, this heat treatment having the effect of eliminating the sublimable resin by sublimation and of thus conferring on the metallic mass of the blank the desired porous character, And finally, subjecting the resulting blank to the hot sintering treatment proper.

The operation of shaping the blank is, preferably, calendering or rolling.

As sublimable resins usable in a method according to this arrangement, there may be mentioned, especially, polymethylmethacrylate, which appears by far the most advantageous sublimable resin for this application (quality of results obtained and economy in practising the method), this product having in addition the advantage of subliming towards 320° C. without leaving any residue and in giving as a gaseous phase methylmethacrylate monomer which can then advantageously be recovered by liquefaction at ambient temperature for use again in the course of a new operation of applying the method.

And, although appearing to have generally less advantage, polystyrene which sublimes towards 200–220° C. thereby generating a gaseous mixture of styrene and free radicals and by leaving a solid residue in negligible amount and not harmful in most cases, as well as resins of the polymethylstyrene type or copolymers of glycol phthalomaleate and of methylmethacrylate.

As regards the preliminary operation of shaping the blank produced from a metallic powder incorporated in a liquid product having to present, once this shaping is achieved, the condition of a sublimable solid resin such as those which have just been considered, one may, according to the invention, have recourse to various solutions are regards the nature of the abovesaid liquid product.

A first solution consists in adopting, as initial liquid product, a monomer liquid at ambient temperature, in which monomer are then incorporated a polymerisation catalyst if necessary and the metallic powder to be agglomerated, this mixture being heated for the polymerisation of the monomer, to which it may be advantageous to add a suitable solvent (acetone or better cyclohexanone) favouring the formation of long chains.

When the sublimable solid resin to be obtained by polymerisation is polymethylmethacrylate, there is utilised, as monomer, methylmethacrylate, the polymerisation catalyst being preferably benzoyl peroxide.

When the sublimable solid resin to be obtained by polymerisation is polystyrene, there is utilised as monomer, styrene.

A second solution consists in adopting, as initial liquid product, a solution of polymer produced in a solvent evaporating at a temperature less than the sublimation temperature of the polymer, the metallic powder to be agglomerated being then incorporated in this polymer solution.

When the polymer is polymethylmethacrylate, the solvent is advantageously acetone or again better cyclohexanone.

A third solution, derived from the two preceding ones, consists in adopting, as initial liquid product, a mixture of liquid monomer (supplemented if necessary by a polymerisation catalyst) and a solution of the corresponding polymer so as to obtain, after evaporation of the solvent of the polymer and polymerisation of the monomer, a plasticised long-chain polymer, this solution enabling the plasticity of the mass to be controlled in the course of homogenisation operations of the said mass and of the positioning of the blank.

When the sublimable solid resin to be obtained is polymethylmethacrylate, there is then advantageously adopted, as monomer, methylmethacrylate supplemented with benzoyl peroxide, and, as polymer solution, polymethylmethacrylate dissolved in acetone or even better in cyclohexanone of which the low volatility will enable the drying out of the mixture in the course of shaping operations, to be slowed down.

Whatever the solution adopted, the initial liquid product (liquid monomer, polymer solution, or mixture of the two) takes the desired form (solid resin sublimable at a temperature less than the sintering treatment temperature) in the course of operations of shaping the blank.

It appears advantageous, at this point in the description, to emphasize the advantages offered by the presence, in the blank thus formed, of a binder having taken the form of such a solid resin sublimable at a sublimation temperature less than the sintering temperature, among which advantages may be mentioned:

The homogeneity (from the point of view of compactness) of the structure of the porous metallic material obtained, due to the fact that the sublimation of the resin is effected without passage through a liquid phase and with a progressive gaseous release not giving rise to the formation of bubbles risking compromising the abovesaid homogeneity, The maintenance at a high level of the coefficient of friction between the constituent grains of metallic powder of the porous metallic material, due to the fact that no relative displacement of the said grains is produced, such displacements being troublesome if the binder passes, on its elimination, through a fluid liquid phase playing the role of a lubricant between the grains, And the excellence of the conditions in which the final sintering is carried out due to the fact that the elimination of the solid resin by sublimation leaves practically no residue (especially carbonized) of a nature to contaminate the sintered material.

As regards then the metals capable of being applied for the manufacture of porous metallic materials by a method according to the invention, it is sufficient that they be metals capable of being obtained in powder and which can be agglomerated by sintering at a temperature greater than the sublimation temperature of the sublimable solid resin used as binder in the abovesaid method.

By way of metallic powders usable to this end there may be mentioned powders of iron, nickel, cobalt, chromium, molybdenum, copper, zinc, tungsten, gold, platinum, etc. and powders of metallic alloys such as nickel-chrome, nickel-copper, copper-zinc, copper-tin, nickel-chrome-aluminium, nickel - chrome-titanium - aluminium and molybdenum-silicon.

Finally it should be pointed out that, although the use of a single metallic powder starting materal (pure metal or alloy), may be contemplated, it appears preferable, in most cases, to resort to a mixture of several metallic powders in order to obtain a porous material of an alloy and to operate then the treatment of sintering and diffusion in a hydrogenated-halogenated atmosphere, at a temperature preferably between 900 and 1100° C.

Under these conditions, there will be seen the wide possibilities available, by varying the composition, the granulometry and the proportions of the starting powders, to obtain porous metallic parts with extremely varied characteristics (density, porosity, resistance to heat and to corrosion, resistivity, etc.).

To illustrate the arrangements which have just been discussed, there will be described below in more detailed manner a particularly preferred embodiment of the said arrangements, namely the application of the arrangements concerned to the manufacture of thin porous metallic plates, intended especially to play the role of electrodes in fuel cells, having to possess, besides a fine porosity (diameter of pores between 1 and 10 microns), great homogeneity of this porosity, high permeability (total porosity comprised between 30 and 50%) and a great surface lightness (less than 0.3 g./cm.$^2$), additional properties when these plates must effectively play the role of electrodes, among which additional properties the following especially should be mentioned:

Good resistance to corrosion under heat (at a temperature of the order of 800° C. which is substantially the temperature of the fuel gases in a cell), As good a surface condition as possible, A thickness not exceeding preferably 5/10 mm., An electrical insulating power under a voltage of several volts (of the order of 1 to 5 volts), A coefficient of expansion compatible with that of the solid electrolyte which must coat the plates concerned, which electrolyte is generally zirconia, And, finally, a cost price compatible with industrial use.

The manufacturing procedure of such thin porous plates comprises then essentially four successive stages, namely, the preparation of the mixture must serve for the shaping of the plate, the shaping proper, the elimination of the sublimable solid binder and the sintering of the plate in a hydrogenated-halogenated atmosphere.

Preparation of the initial mixture

As regards then the preparation of the starting mixture, there is preferably adopted a mixture of fine nickel powder (granulometry between 1 and 10 microns) and of ultrafine chromium powder (granulometry of the order of a micron), the proportions by weight of these two powders being respectively in the ratio of 80 to 20.

There is then added to this mixture of powders, in a proportion of 30 to 60% by volume, either methylmethacrylate monomer liquid at ambient temperature supplemented with a polymerisation catalyst (benzoyl peroxide) and advantageously with a solvent such as cyclohexanone, this whole being heated to ensure polymerisation in a reasonable time, or a solution of polymethylmethacrylate (50% by weight) and of cyclohexanone (50% by weight), or again a mixture of equal parts of a polymerized such monomer and of a such solution, the whole being malaxated until a homogeneous product is obtained.

Shaping of the plate

This shaping is effected by a rolling or calendering operation carried out so as to bring the plate to the desired thickness, which thickness is preferably between 0.1 and 1 mm., the plate being then cut up with scissors or a guillotine to the required dimensions, after which there follows a drying of the plate at ambient temperature until complete evaporation of the solvent when the starting mixture include cyclohexanone.

The plates are then subjected to a smoothing treatment on plates of glass or of chromed brass, the above-said plates being stacked for this purpose in an oven brought to a temperature of about 150° C.

The plates thus smoothed are then arranged on supports (graphite plates advantageously coated with a layer of a metallic carbide stable at high temperature, or sheets of molybdenum or of tungsten) which will serve for the holding of the said plates for the subsequent operations.

Elimination of the sublimable solid binder

Elimination of the binder by sublimation is carried out by heating in air or in a protective gas with a progressive rise of temperature starting from about 150° C. (for example by steps of 5 to 10° C. per hour) up to a temperature of about 320° C., which temperature is maintained for about two hours, after which the binder is found to be entirely eliminated by sublimation. It is to be noted that the risks of adhesion between the plates and their supports are practically non-existent due to the fact that the polymer does not pass through a liquid phase on its elimination.

Sintering of the plates

The sintering of the plates is conducted in a hydrogenated-halogenated atmosphere at a temperature between 900 and 1100° C. and, preferably, at a temperature of the order of 1050° C., this treatment ensuring the desired sintering with diffusion of the chromium into the nickel.

The thus sintered plates are advantageously subjected to a final smoothing treatment effected by compression or light rolling and to a final treatment of selective oxidation in a humid hydrogenated atmosphere at a temperature between 750 and 1000° C. to produce, on the surface of the plates, a superficial layer of chromium oxide conferring on the said plates insulating properties from the electrical point of view and better resistance to corrosion under heat.

It should be noted that the sintering treatment in a hydrogenated-halogenated atmosphere is preferably conducted by adopting, as source of halogen, ammonium fluoride or divalent chromium fluoride, the plates being arranged in cases partially sealed to gases and containing the halogen source, which cases are placed in an oven enclosure traversed by a current of hydrogen renewing the active atmosphere in the cases according to a quite conventional technique.

With such a method, there are obtained porous walls having a porosity of 30 to 50%, whose diameter of the pores is of the same order of size as that of the particles of the basic metallic powders, whose surface lightness becomes between 50 and 500 mg./cm.$^2$, whose resistance to corrosion at 800° C. is quite satisfactory, whose coefficient of expansion is compatible with that of zirconia, whose surface condition is particularly smooth and even, and whose cost price is relatively low.

It should be noted that the temperature of use can also be raised by adding, to the initial metallic powders, aluminium powder so as to produce a nickel-chromium-aluminium alloy.

As a result of which and whatever the embodiment adpoted, there are provided porous metallic plates and methods for the manufacture of such plates, of which the advantages emerge sufficiently clearly from the description which has just been given, so that it is unnecessary to enter into any supplementary explanation on this subject.

As is self evident, the invention is in no way limited to those of its embodiments, nor to those of its methods of production of its various parts, which have been more particularly indicated; it embraces, on the other hand, numerous variations.

What we claim is:

1. A method for the manufacture of sintered thin porous metallic sheets of thickness less than 2 mm. having a total porosity of 30 to 50% distributed in the form of fine pores comprising the following successive steps:

incorporating fine metallic powder in a viscous liquid binder comprising a resin sublimable when solid and a solvent for said resin, to produce a shapable mixture, rolling said mixture to produce said sheet of thickness less than 2 mm., said resin and solvent being selected so that the binder preserves its viscous liquid character during the whole rolling operation, only upon completion of said rolling transforming said viscous liquid binder to the state of a sublimable solid resin of which the sublimation temperature is lower than the hot sintering treatment temperature, then subjecting the sheet to a heat treatment conducted at a temperature between the sublimation temperature of said sublimable resin and the temperature of said hot sintering, said heat treatment having the effect of eliminating the sublimable resin by sublimation of the resin without passage through a liquid state and of thus conferring on the metallic mass of the sheet the desired porous character without displacing the metallic powder grains or leaving a residue, and finally, subjecting the resulting sheet to hot sintering.

2. A method according to claim 1, wherein the sublimable solid resin acting as binder is polymethylmethacrylate.

3. A method according to claim 2, wherein the methylmethacrylate resulting from the sublimation of the polymethylmethacrylate is recovered by liquefying at ambient temperature.

4. A method according to claim 1, wherein the sublimable solid resin acting as a binder is polystyrene, a resin of the polymethylstyrene type or a copolymer of glycol phthalomaleate and of methylmethacrylate.

5. A method according to claim 1, wherein the initial liquid product used to effect the shaping of the blank, is a monomer liquid at ambient temperature.

6. A method according to claim 5, wherein there is added to said monomer a polymerisation catalyst.

7. A method according to claim 6, wherein the liquid monomer is methylmethacrylate, the catalyst is benzoyl peroxide and the solvent is cyclohexanone.

8. A method according to claim 1, wherein the initial liquid product, used to effect the shaping of the blank, is a polymer solution produced in a solvent evaporating at a temperature lower than the sublimation temperature of the polymer.

9. A method according to claim 8, wherein the solvent used for polymethylmethacrylate is cyclohexanone.

10. A method according to claim 1, wherein the initial liquid product, used to effect the shaping of the blank, is a mixture of liquid monomer and of a solution of corresponding polymer so as to obtain, after evaporation of the polymer solvent and polymerisation of the monomer, a plasticised long chain polymer.

11. A method according to claim 10, wherein the liquid monomer is supplemented by a polymerisation catalyst.

12. A method according to claim 10, wherein there is utilised as monomer, methylmethacrylate supplemented with benzoyl peroxide, and, as polymer solution, polymethylmethacrylate dissolved in cyclohexanone.

13. A method according to claim 1, wherein there is used, for effecting the shaping of the blank, one at least of the following powders:

powders of iron, nickel, cobalt, chromium, molybdenum, copper, zinc, tungsten, gold, platinum, etc. and metallic alloy powders such as nickel-chrome, nickel - copper, copper-zinc, copper-tin, nickel-chrome-aluminium, nickel-chrome - titanium and molybdenum-silicon.

14. A method according to claim 1, wherein there is used, to effect the shaping of the blank, a mixture of several metallic powders in order to obtain a porous material of an alloy and operating then the treatment of sintering and diffusion in a hydrogenated-halogenated atmosphere.

15. A method according to claim 14, wherein the halogen is fluorine.

16. A method according to claim 14, wherein said treatment of sintering and diffusion is carried out at a temperature between 900 and 1100° C.

17. A method according to claim 15, wherein said treatment of sintering and diffusion is carried out at a temperature between 900 and 1100° C.

18. A method according to claim 11, wherein there is adopted, as the mixture of metallic powders, a mixture of fine nickel powder and of ultrafine chromium powder.

19. A method according to claim 18, wherein said mixture of metallic powders includes aluminium powder.

References Cited

UNITED STATES PATENTS

| | | | |
|---|---|---|---|
| 3,214,270 | 10/1965 | Valyl | 75—222 |
| 3,287,112 | 11/1966 | Blaha | 75—222 |
| 3,433,632 | 3/1969 | Elbert et al. | 75—222 |
| 3,325,280 | 6/1967 | Horn et al. | 75—222 |
| 3,078,552 | 2/1963 | Grandey | 75—222 |
| 3,340,054 | 9/1967 | Ward | 75—222 |
| 3,312,546 | 4/1967 | Mayer et al. | 75—222 |
| 3,336,134 | 8/1967 | Kulp | 75—222 |
| 2,593,943 | 4/1952 | Wainer | 75—222 |

FOREIGN PATENTS

| | | | |
|---|---|---|---|
| 616,839 | 1/1949 | Great Britain | 75—222 |

REUBEN EPSTEIN, Primary Examiner

U.S. Cl. X.R.

75—224